United States Patent
Xia

(10) Patent No.: US 12,319,982 B2
(45) Date of Patent: Jun. 3, 2025

(54) PROCESS AND SYSTEM FOR RECOVERING RARE EARTH ELEMENTS

(71) Applicant: His Majesty the King in Right of Canada as Represented by the Minister of Natural Resources, Ottawa (CA)

(72) Inventor: Chen Xia, Kanata (CA)

(73) Assignee: His Majesty the King in Right of Canada as Represented by the Minister of Natural Resources, Ottawa (CA)

( * ) Notice: Subject to any disclaimer, the term of this patent is extended or adjusted under 35 U.S.C. 154(b) by 807 days.

(21) Appl. No.: 17/426,044

(22) PCT Filed: Mar. 12, 2020

(86) PCT No.: PCT/CA2020/050328
§ 371 (c)(1),
(2) Date: Jul. 27, 2021

(87) PCT Pub. No.: WO2020/181381
PCT Pub. Date: Sep. 17, 2020

(65) Prior Publication Data
US 2022/0112576 A1 Apr. 14, 2022

Related U.S. Application Data

(60) Provisional application No. 62/817,036, filed on Mar. 12, 2019.

(51) Int. Cl.
C22B 59/00 (2006.01)
C22B 3/06 (2006.01)
(Continued)

(52) U.S. Cl.
CPC ............ C22B 59/00 (2013.01); C22B 3/06 (2013.01); C22B 3/22 (2013.01); C22B 3/44 (2013.01)

(58) Field of Classification Search
CPC .. C22B 59/00; C22B 3/08; C22B 3/22; C22B 3/44
See application file for complete search history.

(56) References Cited

U.S. PATENT DOCUMENTS 1,523,444 A * 1/1925 Soanes ............... C22B 15/0063
75/727
4,816,233 A 3/1989 Rourke et al.
(Continued)

FOREIGN PATENT DOCUMENTS

CA 2790558 A1 3/2014
CN 101717331 A * 6/2010
(Continued)

OTHER PUBLICATIONS

International Search Report and Written Opinion for PCT International Patent Application No. PCT/CA2020/050328, mailed May 25, 2020.

*Primary Examiner* — George Wyszomierski
*Assistant Examiner* — Nikolas Takuya Pullen
(74) *Attorney, Agent, or Firm* — Banner & Witcoff, Ltd.

(57) ABSTRACT

The present application provides a process and system for recovery of rare earth elements. In particular, the present application provides a process for obtaining a precipitate of rare earth elements (REE), comprising: (a) obtaining an acidic composition comprising the REE (such as, for example, a pregnant leach solution); (b) adding a reducing agent to the acidic composition and adjusting the pH with a basic agent; (c) adding oxalate directly to the composition formed in step (b) and mixing to form an REE oxalate
(Continued)

precipitate; (d) removing the REE oxalate precipitate from the mixture of step (c).

20 Claims, 11 Drawing Sheets

(51) Int. Cl.
*C22B 3/22* (2006.01)
*C22B 3/44* (2006.01)

(56) References Cited

U.S. PATENT DOCUMENTS

2014/0373683 A1\* 12/2014 Boudreault .............. C22B 58/00
　　　　　　　　　　　　　　　　　　　　　75/743
2018/0023168 A1\* 1/2018 Yamaguma ............... C22B 3/42
　　　　　　　　　　　　　　　　　　　　　75/416

FOREIGN PATENT DOCUMENTS

| CN | 108342574 A | \* | 7/2018 | ............... C22B 3/02 |
| WO | WO 2003/104149 A1 | | 12/2003 | |
| WO | WO 2014/113742 A2 | | 7/2014 | |
| WO | WO 2018/195642 A1 | | 11/2018 | |

\* cited by examiner

PROCESS AND SYSTEM FOR RECOVERING RARE EARTH ELEMENTS

CROSS-REFERENCE TO RELATED APPLICATIONS

The present application is a 35 U.S.C. § 371 filing of International Patent Application No. PCT/CA2020/050328, filed Mar. 12, 2020, which claims priority to U.S. Provisional Patent Application No. 62/817,036, filed Mar. 12, 2019, which are incorporated herein in their entirety.

FIELD OF THE INVENTION

The present application pertains to the field of rare earth recovery. More particularly, the present application relates to a method and system for recovery of rare earth elements from acidic mixtures, such as leachates.

INTRODUCTION

Recovery of rare earth elements (REE) from leaching processes can be an involved process with many purification steps. As part of the overall recovery process, REE dissolved in aqueous solutions, such as leachates, can be precipitated by adding oxalic acid under controlled conditions. However, such processes suffer from the drawbacks of requiring a high consumption of oxalic acid and producing low purity of the REE-oxalate precipitate. This results in poor metallurgical and economic returns. These problems are more significant when the REE are dissolved in a $H_2SO_4$ solution, which is typical in standard leaching processes.

An alternative method for recovery REE from solution is to precipitate iron and some other impurities prior to the oxalic acid precipitation step. This operation can be costly and difficult since it is a more complicated process including difficult solid-liquid separations.

To date, attempts to address these drawbacks have involved removing the majority of impurities from the REE-containing acidic solution prior to the oxalic acid precipitation. This improves the purity of the REE-oxalate precipitate and can aid in controlling the consumption of oxalic acid. However, this approach results in increased complexity from additional early steps in the recovery process, with a concomitant significant increase in operating costs.

FIG. 1 provides an overview of a conventional process for REE production. In most cases, as shown in FIG. 1, the process for producing REE elements from ore, includes a first step that includes baking the ore or concentrate in the presence of acid, and then leaching the baked solid with water. This process is referred to as an acid baking and water leaching process.

The pregnant leach solution (PLS) contains REE and many other dissolved impurities, including metallic elements and anionic impurities, such as sulfate. PLS must be treated to separate REE from other impurities, using a process such as the one shown in FIG. 2. The PLS is typically acidic. By raising the pH (neutralization), ferric impurities are precipitated as various solid iron hydroxide precipitates. In this procedure, some other impurities, such as aluminum, calcium and thorium are coprecipitated and a purified PLS is produced. The REE can be precipitated from the purified PLS in many forms, such as oxalate salts or carbonate salts. The precipitated REE typically requires further purification, which requires the precipitated REE to be dissolved for removal of minor metallic and anionic impurities. At the end of this process, REE is precipitated again from this further purified solution. This second REE precipitate is subsequently processed to produce marketable rare earth oxides and/or chlorides.

The impurity removal step of the standard process shown in FIG. 2 is further detailed in FIG. 3. FIG. 3 schematically depicts a typical iron precipitation process for removing the majority of impurities from the PLS, so that most of the REE are retained in the purified PLS. The process depicted in FIG. 3 is a simplified process, which is typically further complicated in practical operation. As shown, the process involves a series of solid liquid separations. In operation such separations can be challenging and costly. Furthermore, a significant percentage of REE is typically lost in the second ferrihydrite solid product, such that this solid product is often returned to the leaching step. The whole process is typically operated at an elevated temperature, for example, 80° C.

The purified PLS contains a small amount of impurities, which are removed from the REE by precipitation of the REE as oxalate or carbonate salts. These salts typically need further treatment to be re-dissolved and further purified to remove minor remaining impurities. REE in the further purified solution is then recovered as REE oxalate or other forms of solid product before they are then treated to produce marketable REE oxides or chlorides.

The current REE recovery processes suffer from a number of drawbacks: they are complex and they are costly, in part because of the use of expensive reagents, such as oxalic acid. Furthermore, the requirement for numerous solid liquid separations decreases the REE yield. There remains a need for alternative REE recovery processes that address some or all of these drawbacks.

The above information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present application is to provide a process and system for recovery of rare earth elements. In particular, the present application provides a process and system for recovery of rare earth elements that may be more economic than current processes, in terms of cost and/or system resource requirements.

In accordance with an aspect of the present application, there is provided process for obtaining a precipitate of rare earth elements (REE), comprising: (a) obtaining an acidic composition comprising the REE (such as, for example, a pregnant leach solution); (b) adding a reducing agent to the acidic composition and adjusting the pH to 0 to 3.5 with a first amount of a basic agent; (c) adding oxalate directly to the composition formed in step (b) and mixing to form an REE oxalate preciptate; (d) removing the REE oxalate preciptate from the mixture of step (c) by a first solid liquid separation process; and, optionally, (e) washing the REE oxalate precipitate with a wash liquid to obtain a clean REE oxalate.

In accordance with another aspect, there is provided a system or apparatus for performing the above process for precipitation of REE.

In accordance with some embodiments, in step (b) the pH is adjusted before, during or after addition of the reducing agent. For example, the pH can be adjusted to a pH of 0.5 to 3.0, or a pH of 1 to 2.5, or to a pH of about 2.

In accordance with some embodiments, the basic agent comprises one or more of a sodium, magnesium, calcium or ammonium salt of hydroxide, oxide, carbonate, or bicarbonate.

In accordance with some embodiments, the reducing agent is Fe(0), which is optionally in the form of iron powder, iron chips or an iron screen.

In accordance with some embodiments, in step (d), prior to removing the REE oxalate precipitate or simultaneous with removal of the REE oxalate, excess Fe(0) is separated from the mixture, optionally using one or more magnets, or by gravity separation.

In accordance with some embodiments, in step (c), the oxalate is added as a solid, such as an oxalate salt, or as an aqueous solution of oxalate or oxalic acid. The oxalate can be added in a single addition, or a step wise or continuous addition over a period of time, such as at least 1 minute, or at least 30 minutes, or at least 60 minutes.

In accordance with some embodiments, in step (d), the first solid liquid separation process is filtration, settling (or sedimentation), centrifugation, or decantation.

In accordance with some embodiments, following step (d) a second REE oxalate precipitate is removed by performing a second solid liquid separation on the mixture remaining after the first solid liquid separation. In an example of this embodiment, the second REE oxalate precipitate can be formed by: (i) adding a second reducing agent to the mixture remaining after the first solid liquid separation and/or adjusting the pH of the mixture remaining after the first solid liquid separation to 0 to 3.5 with a second amount of basic agent, which can be the same or different from the first amount of basic agent used; and (ii) optionally, adding oxalate to the liquid composition formed in step (i) and mixing to form the second REE oxalate precipitate.

Optionally, prior to removal of the second REE oxalate precipitate excess ferrous sulfate is added to the mixture to precipitate ferrous oxalate and the resulting ferrous oxalate precipitate is removed by the second solid liquid separation process together with the second REE oxalate precipitate. In some examples, the combination of the ferrous oxalate precipitate and the second REE oxalate precipitate is washed with an acid to redissolve the ferrous oxalate under oxidative conditions and remove it from the second REE oxalate precipitate.

In some embodiments, where a second REE oxalate precipitate is formed, the second reducing agent is Fe(0), which can again be in the form of iron powder, iron chips or an iron screen. Excess Fe(0) is optionally removed prior to removing the second REE oxalate precipitate, for example by using one or more magnets, or by gravity separation In accordance with one embodiment the process for obtaining an REE precipitate is performed at a temperature from 5° C. to boiling temperature, or from 10° C. to 50° C., or more from 20° C. to 35° C., or about 25° C., or ambient temperature.

In accordance with another embodiment, the process additionally comprises: combining the liquid remaining after removal of the REE oxalate in step (d) with the acidic wash liquid from step (e); and recovering excess oxalate from the resulting combination.

BRIEF DESCRIPTION OF TABLES AND FIGURES

For a better understanding of the application as described herein, as well as other aspects and further features thereof, reference is made to the following description which is to be used in conjunction with the accompanying drawings, where:

Figure 8:
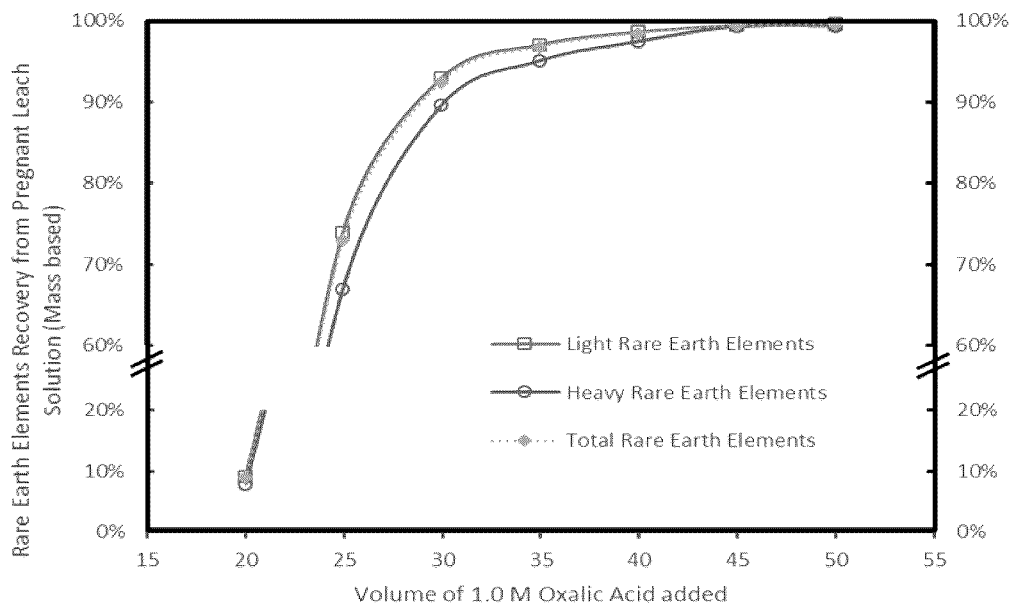
Figure 9:
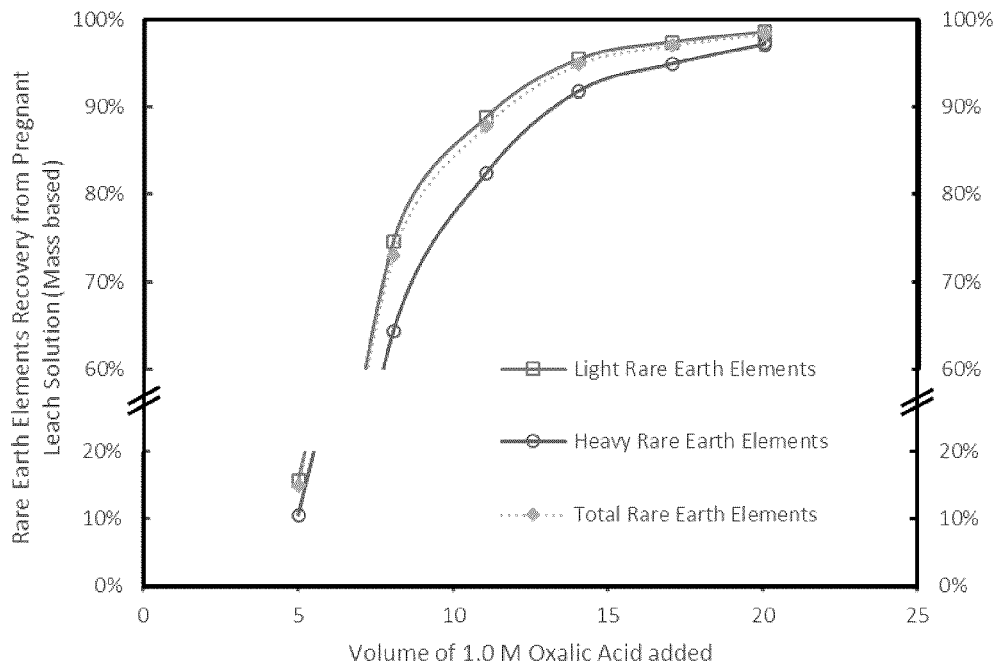
Figure 10:
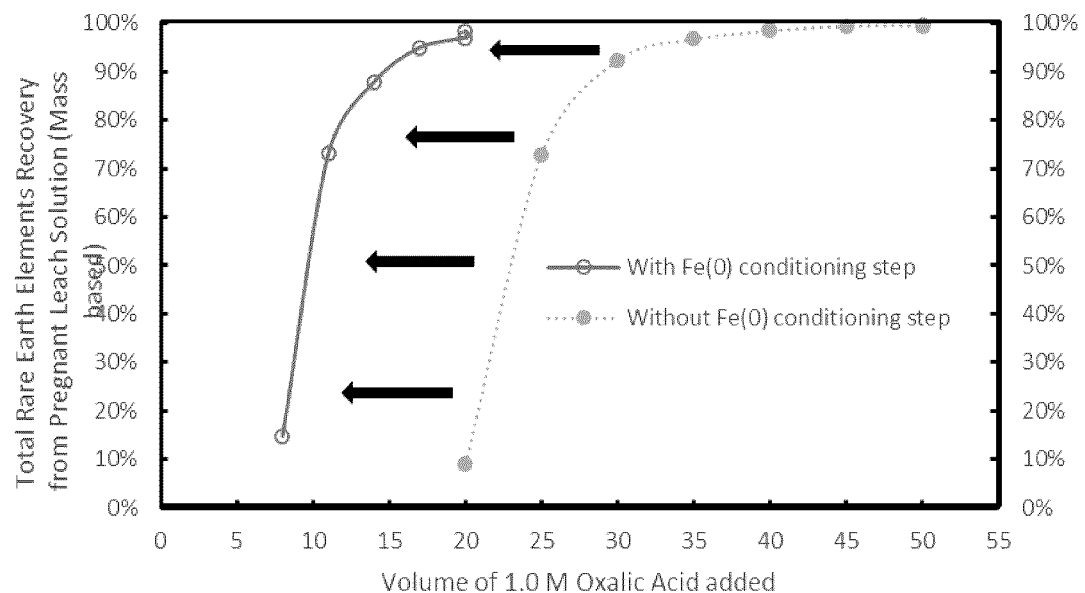
Figure 11:
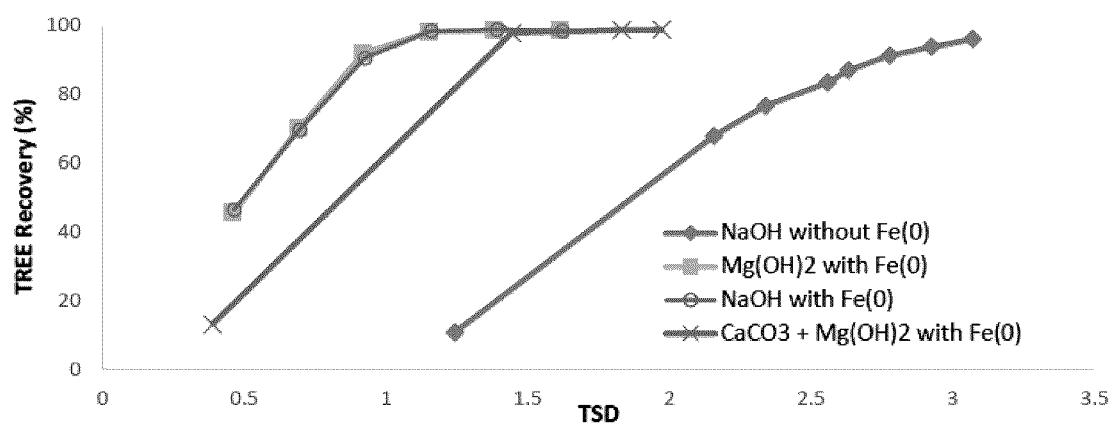
Figure 12:
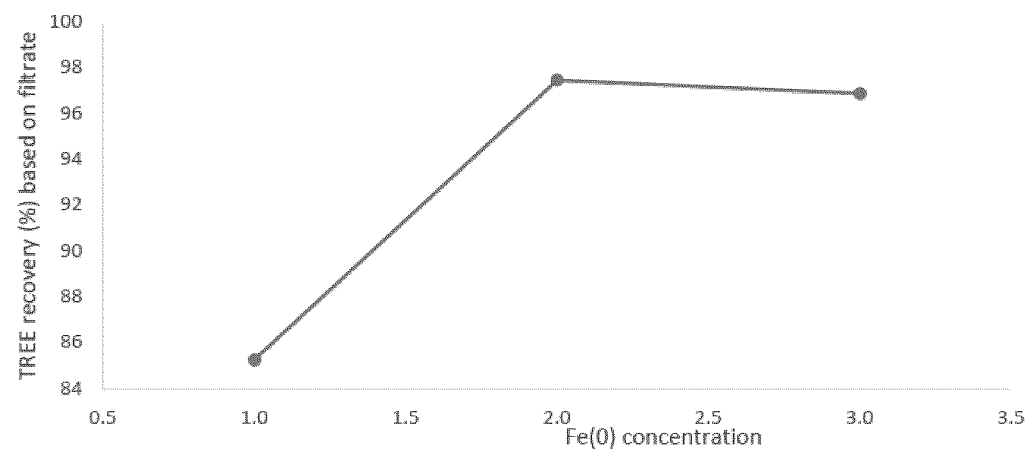
Figure 13:
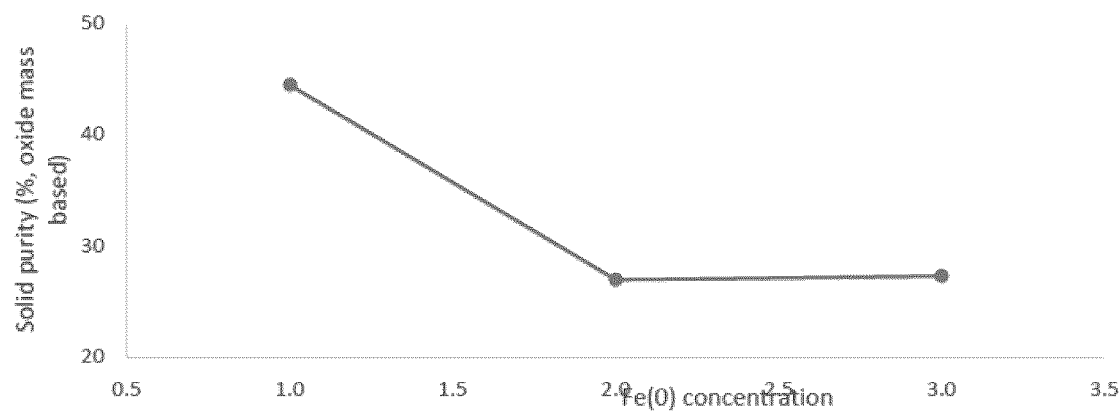
Figure 14:
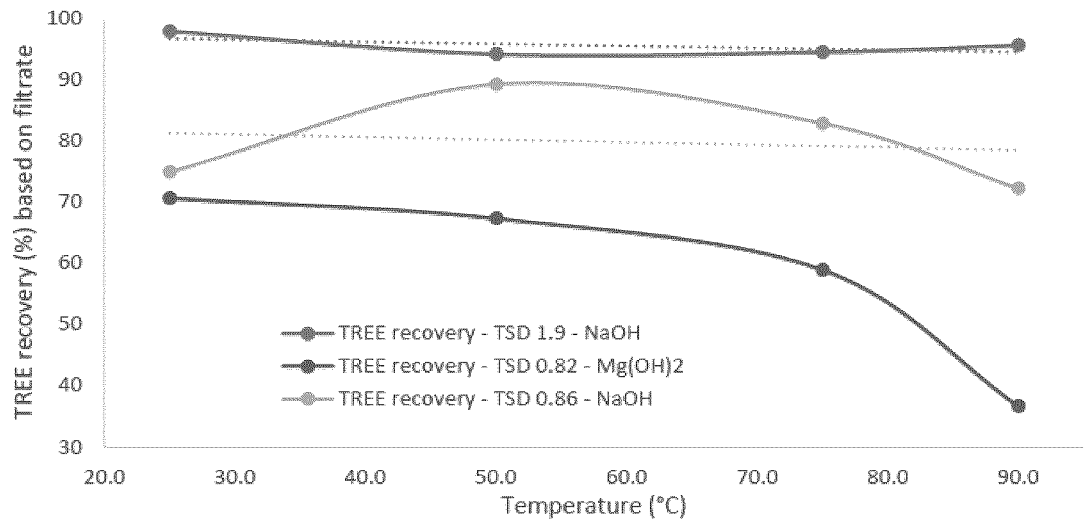
Figure 15:
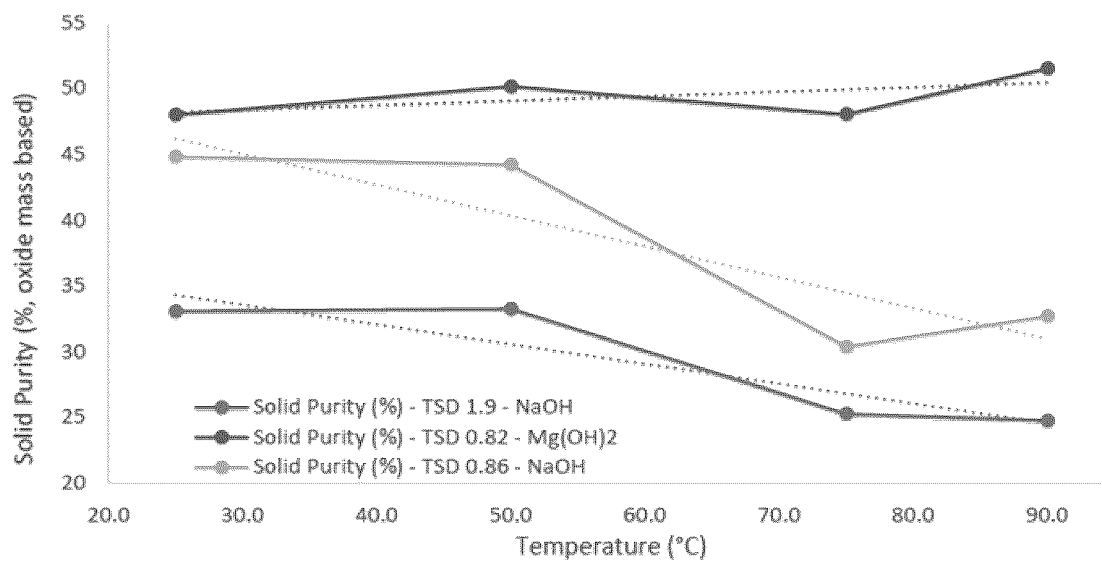
Figure 16:
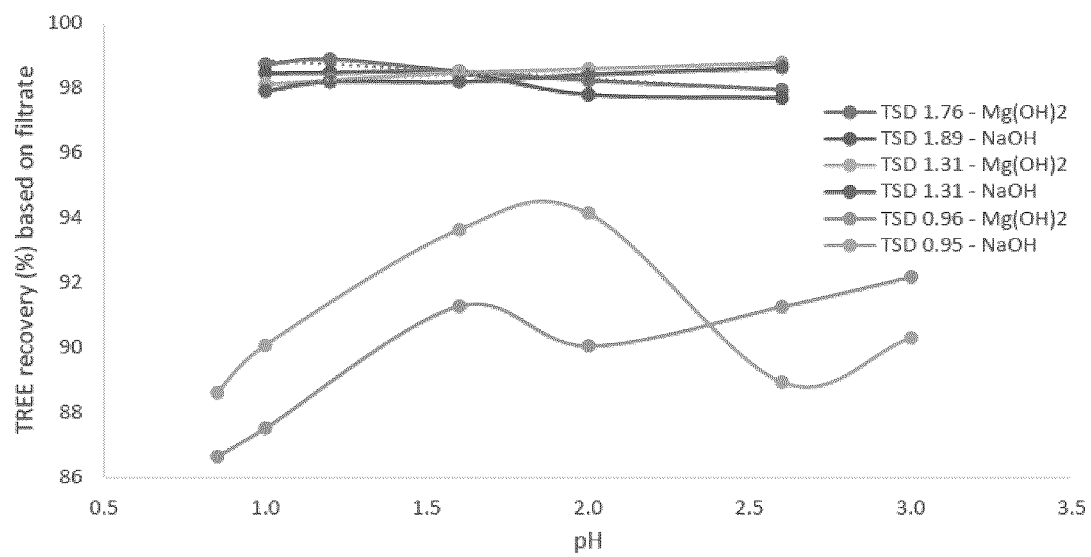
Figure 17:
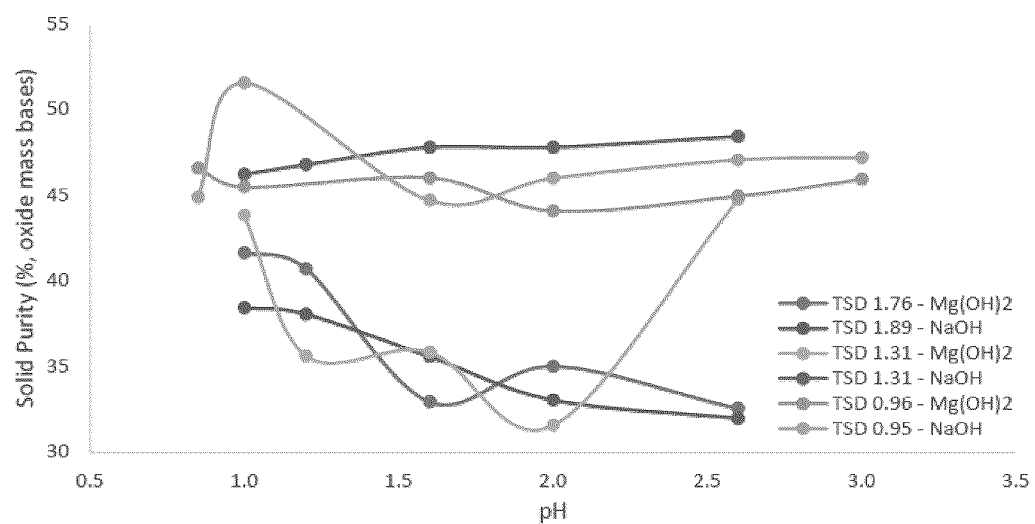
Figure 18:
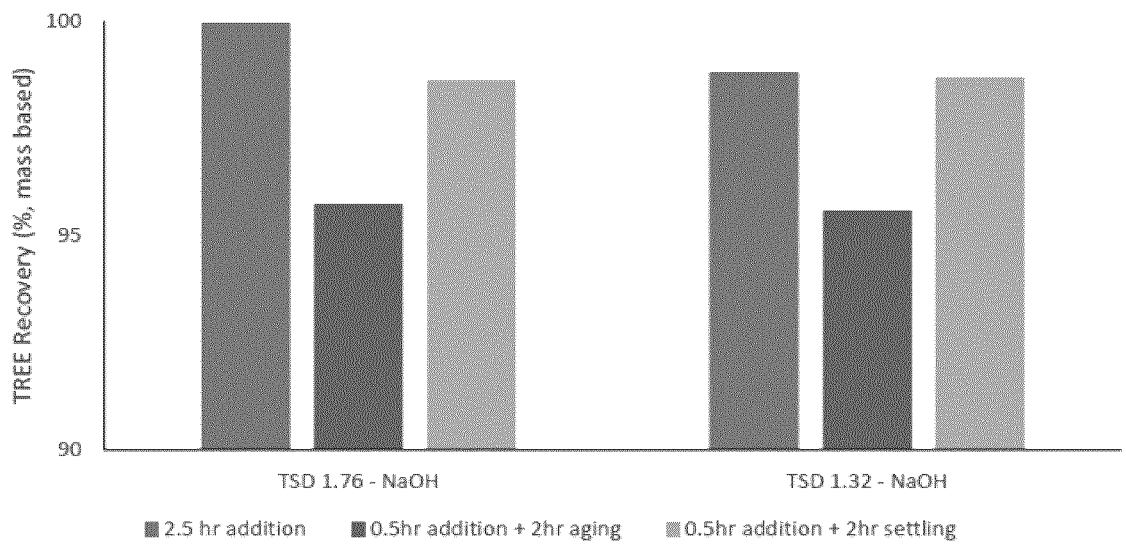
Figure 19:
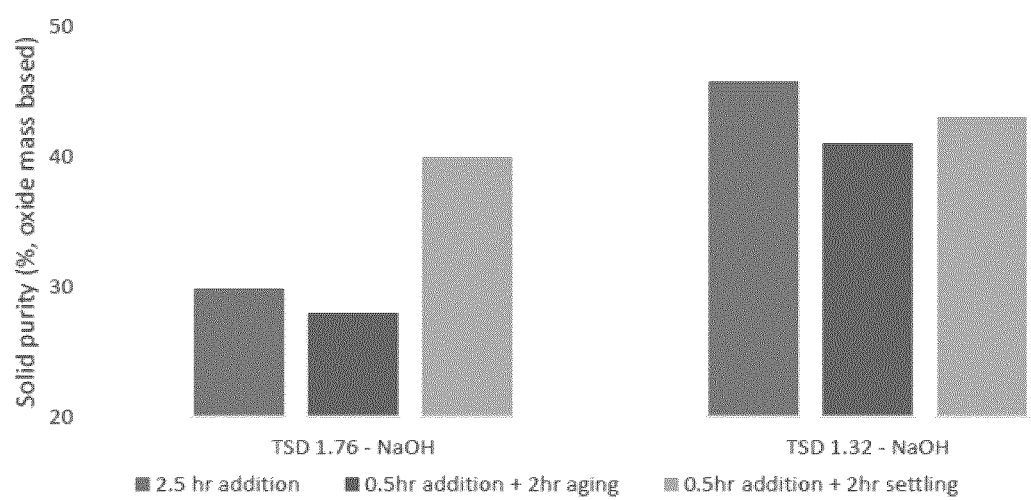

FIG. 8 graphically depicts a titration of 400 mL of PLS in the absence of Fe(0), recovery of LREE, HREE and TREE from 400 mL of PLS as a function of volume of 1.0 M oxalic acid added (titration was performed at pH 2.0 and 25° C., with pH controlled using NaOH (10 wt/wt %);

FIG. 9 graphically depicts a titration of 400 mL of PLS in presence of 1.5 grams of Fe(0). Recovery of LREE, HREE and TREE from 400 mL of PLS in function volume of OXA 1.0 added. Titration performed at pH 2.0 and 25° C. pH controlled using NaOH (10 wt/wt %);

FIG. 10 graphically depicts a shift of a titration curve to the left when in presence of Fe(0);

FIG. 11 graphically depicts a titration of a synthetic solution to determine end point for oxalic acid demand; where titrations were performed at 25° C. while maintaining a pH of 2.0 and the analysis was performed on mass basis;

FIG. 12 graphically depicts the effect of iron powder concentration on recovery of total rare earth elements; tests were performed at pH 2.0 with ATC, 25° C., mixing at 250/400 rpm, and the analysis was performed on a mass basis;

FIG. 13 graphically depicts the effect of iron powder concentration on solid purity, tests were performed at pH 2.0 with ATC, 25° C., mixing at 250/400 rpm, and the analysis was performed on a mass basis;

FIG. 14 graphically depicts the effect of temperature on recovery of total rare earth elements; tests were performed at pH 2.0 with ATC, mixing at 250/400 rpm, and the analysis was performed on a mass basis;

FIG. 15 graphically depicts the effect of temperature on solid purity; tests were performed at pH 2.0 with ATC, mixing at 250/400 rpm, and the analysis was performed on a mass basis;

FIG. 16 graphically depicts the effect of pH on recovery of total rare earth elements; tests were performed at 25° C., mixing at 250/400 rpm, and the analysis was performed on a mass basis;

FIG. 17 graphically depicts the effect of pH on solid purity; tests were performed at 25° C., mixing at 250/400 rpm, and the analysis was performed on a mass basis;

FIG. 18 graphically depicts the effect of aging and settling on total rare earth recovery; tests were performed at 25° C., mixing at 250/400 rpm, and the analysis was performed on a mass basis; and FIG. 19 graphically depicts the effect of aging and settling on solid purity; tests were performed at 25° C., mixing at 250/400 rpm, and the analysis was performed on a mass basis.

DETAILED DESCRIPTION

Definitions

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

Figure 1:
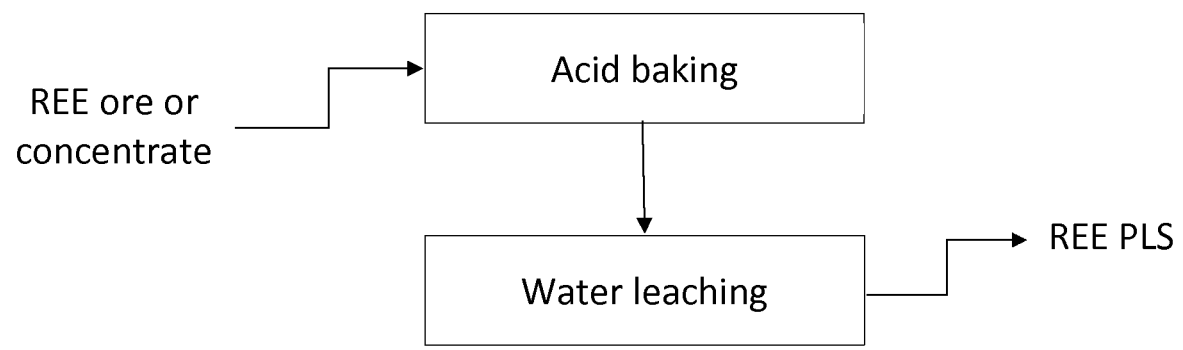
FIG. 1 is a flowchart illustrating a conventional process for producing a pregnant leach solution from and REE-containing ore or concentrate.
Figure 2:
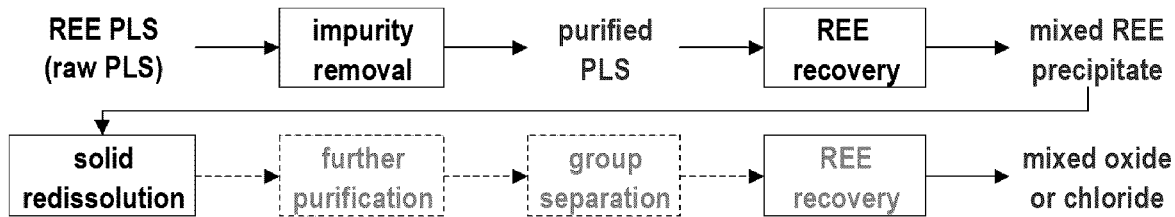
FIG. 2 is a flowchart illustrating a conventional process for purifying an REE-containing pregnant leach solution to produce marketable REE salts (e.g., oxides or chlorides)
Figure 3:
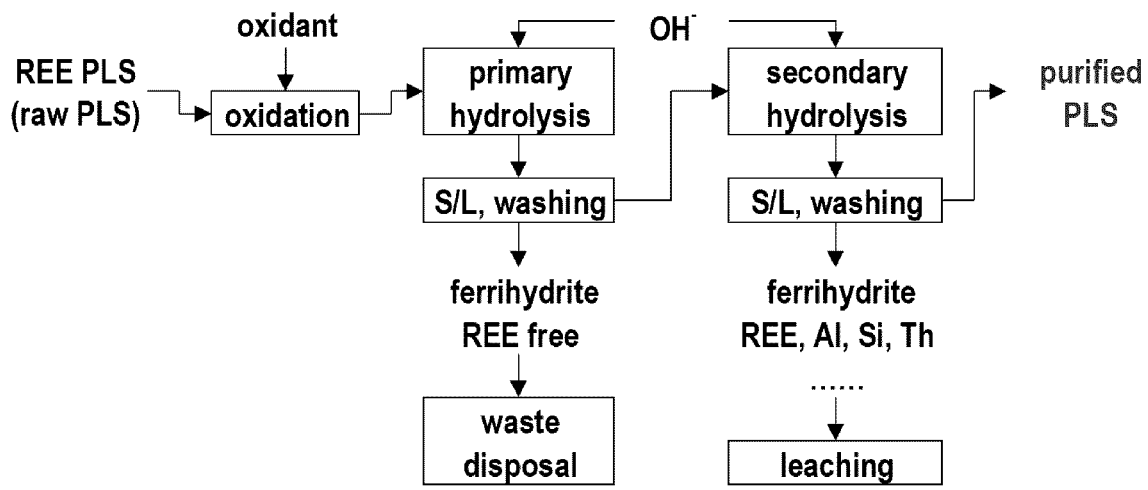
FIG. 3 is a flowchart summarizing purification steps of a conventional process for purifying an REE-containing pregnant leach solution.

The following acronyms are used herein:
PLS: Pregnant leach solution
Fe(0): Reduced iron, such as iron powder reduced by hydrogen
REE: Rare earth elements, which include: lanthanides, scandium and yttrium
LREE: Light rare earth elements, which includes:
  Lanthanum (La)
  Cerium (Ce)
  Praseodymium (Pr)
  Neodymium (Nd)
  Promethium (Pm)
  Samarium (Sm)
  Europium (Eu) and
  Gadolinium (Gd)
  Scandium (Sc) is generally included in LREE due to his similar
    chemical behavior
HREE: Heavy rare earth elements, which include:
  Terbium (Tb)
  Dysprosium (Dy)
  Holmium (Ho)
  Erbium (Er)
  Thulium (Tm)
  Ytterbium (Yb)
  Lutetium (Lu)
  Yttrium (Y) is generally included in LREE due to his similar chemical behavior
TREE Total rare earth elements
REO: Rare earth oxides
OXA·H$_2$O: Oxalic acid dihydrate H$_2$C$_2$O$_4$·2H$_2$O
Oxalate: C$_2$O$_4^{2-}$
PLS: REE pregnant leach solution
BLS: REE barren leach solution
DOP: direct oxalate precipitation without prior PLS purification steps
OXA: Oxalic acid The present application provides a process and system for REE recovery from acidic solutions, such as leachate solutions from ore processing. The present process is a process for obtaining a precipitate of REE from an acidic composition by adding a reducing agent to the acidic composition, which has a pH of 0.5 to 3 or is adjusted to a pH of 0.5 to 3 using a basic agent, and adding oxalate directly to the composition with the reducing agent. This forms an REE oxalate precipitate in the mixture, which is removed using a solid-liquid separation. The resultant REE oxalate can then be washed and further processed to marketable REE or REE salts. The process is referred to herein as a direct oxalate precipitation process since the oxalate is added directly to the acidic composition comprising a reducing agent without prior purification or precipitation steps, as required in conventional REE recovery processes, such as those depicted in FIGS. 1-3.

Typically, REE is not directly recovered from raw PLS as REE oxalate. One of the reasons is the requirement for relatively large amounts of oxalate, which makes the process less attractive because it is expensive and complicated. In the presence of ferric, oxalate forms a ferric oxalate complex in the solution, resulting in less free oxalate available for producing REE oxalate. To completely precipitate REE, the typical consumption of oxalate is between 1 and 2 times of calculated value of REE present. The term "times of stoichiometric demand" or "TSD" is used to represent oxalate consumption. In the presence of ferric impurities, the TSD is significantly higher. For this reason, a direct oxalate precipitation would not have been previously considered to be a realistic option in REE production.

Figure 4:
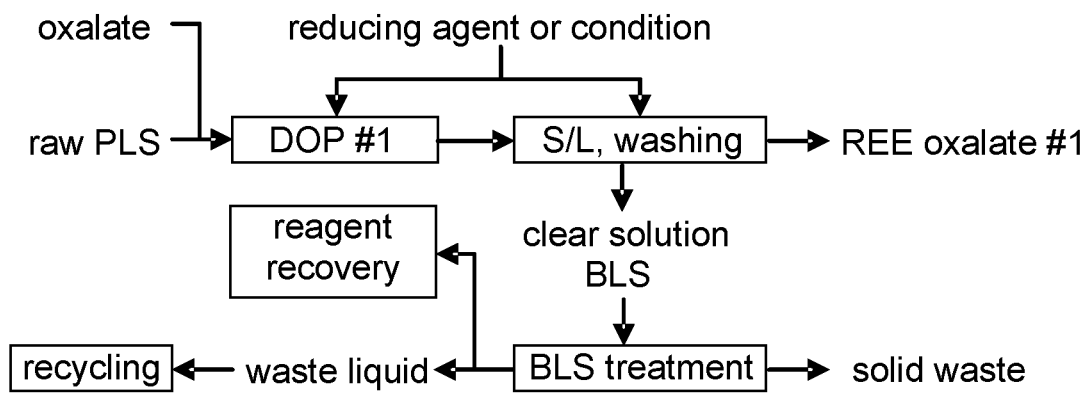
FIG. 4 is a flowchart summarizing a one-step direct oxalate precipitation process according to one embodiment.

The present inventor has surprisingly found that a direct oxalate precipitation is possible when the oxalate is added to the raw, acidic PLS in the presence of a reducing agent. A general direct oxalate precipitation process is depicted FIG. 4. As shown in FIG. 4, the process comprises the steps of: adding a reducing agent to the acidic PLS and adjusting the pH to 0 to 3.5 with a basic agent; adding oxalate directly to the composition comprising the reducing agent and mixing to form an REE oxalate preciptate; and removing the REE oxalate preciptate from the resulting mixture by a solid/liquid separation process and, optionally, washing the REE oxalate precipitate with a wash liquid to obtain a clean REE oxalate ("REE oxalate #1).

The chemical reaction that is responsible for REE precipitation is shown in Eq 1.

$$RE^{3+}+C_2O_4^{2-}=RE_2(C_2O_4)_3 \tag{1}$$

The product, mixed REE oxalate precipitate is sufficiently clean to proceed to a final purification to produce a marketable product. The direct oxalate precipitation process significantly simplifies the procedure for REE recovery in comparison to conventional processes that require multiple solid liquid separation steps, with step wise addition and removal of precipitation reagents.

Step 1: Creation of Reducing Conditions

To minimize the amount of oxalate added and/or the consumption of oxalate, the present method includes the addition of a reducing agent or combination of reducing agents either before or during oxalate addition to the REE-containing acidic feed solution. The reducing agent(s) that must be capable of substantially reducing ferric ion to ferrous ion, in order to avoid the production of ferric oxalate, which would reduce the amount of free oxalate available to form the REE-oxalate. In this way, the free oxalate concentration is maximized towards reacting with REE.

Various reducing agents are suitable for use in the present method. For example, Fe(0), hydrogen gas, carbon dioxide gas, nitrogen gas, and sulfite salts. Furthermore, various forms of iron metal can be used, for example: powder, wires, wool, dust, chips and the like. In certain embodiments, a finer iron metal is employed as the reducing agent, to accelerate the reactions. The reduction reaction from the use of iron metal is shown in equation 2.

$$2Fe^{3+} + Fe = 3Fe^{2+} \quad (2)$$

The success of the direct oxalate precipitation process is based on maintaining reducing conditions, through the addition of one or more reducing agents or generation of reducing conditions, or a combination thereof, to largely reduce ferric ions in the PLS, or other acidic feed solution, to ferrous ion and to maintain the levels of ferric ion at a minimal level throughout the precipitation step (i.e., up until directly before or during the solid/liquid separation step).

Oxalate is added at an amount that is at least stoichiometrically equal to the amount of REE present in the acidic feed solution (e.g., PLS). In practice, it is not always possible, or necessary, to determine the amount of REE present in the acidic feed solution. Accordingly, some embodiments of the present process include the addition of oxalate at an amount that is in stoichiometric excess of the REE estimated to present in the acidic feed solution.

Oxalate can be added as a solid, such as an oxalate salt, or in a liquid form, such as an oxalate salt solution or an aqueous oxalic acid solution. Use of a liquid form of the oxalate can be beneficial for controlling the addition of the oxalate in terms of amount and time of addition. Adding a solid can lead to local areas of excess oxalate, even when the mixture is stirred. Addition of the liquid oxalate can be performed in batches or by continuous addition over a period of time. Continuous addition can be achieved by various means known in the art, such as by continuous pumping of the liquid into the stirring mixture of acidic feed solution.

The pH of the mixture for REE-oxalate formation should be within the range of from 0 to 3.5, or preferably from 0.5 to 3.0, or more preferably from 1 to 2.5, or most preferably about 2.0. In some instances, it is necessary to adjust the pH of the acidic feed solution to fall within this pH range. This is done by adding a basic agent, as would be known in the art.

As would be well understood by those skilled in the field of the present technology, selection of the appropriate pH or pH range, and of the appropriate basic agent for pH adjustment, is based on a number of criteria, including, for example, the initial composition of the acidic feed solution and the nature of the reducing agent(s). Suitable basic agents include, but are not limited to sodium, magnesium, calcium or ammonium salt of hydroxide, oxide, carbonate, or bicarbonate.

In some embodiments, the pH is adjusted at the same time as the reducing agent is added. In alternative embodiments, the pH is adjusted before or after the reducing agent is added.

In some embodiments, the reducing agent is mixed with the REE-containing solution for a period of time to allow the reducing agent to reduce the ferric ions in the solution. This can happen very quickly, for example, if the reducing agent is added in a solution, which is readily mixed. In other instances, the reducing can require more time. This can be a result of, for example, the nature of the acid feed solution, or the use of a solid reducing agent, which will take more time to mix.

The reducing agent does not only reduce ferric ions. The acidic feed solution can contain other ions that require reduction in order to avoid interference with the REE-oxalate precipitation. For example, a PLS can contain Ce' as well as the Fe' ions. In this case, the reducing agent must be at added at an amount sufficient to reduce both of these ions, and must be allowed to react for a sufficient time to reduce all of these ions present.

Step 2: Oxalate Addition and REE-Oxalate Formation

Oxalate is added directly to the mixture from step 1 that contains the acidic feed solution, with a pH as set out above, under reducing conditions. Oxalate is added at an amount that is at least stoichiometrically equal to the amount of REE present in the acidic feed solution (e.g., PLS). In practice, it is not always possible, or necessary, to determine the amount of REE present in the acidic feed solution. Accordingly, some embodiments of the present process include the addition of oxalate at an amount that is in stoichiometric excess of the REE estimated to present in the acidic feed solution.

Oxalate can be added as a solid, such as an oxalate salt, or in a liquid form, such as an oxalate salt solution or an aqueous oxalic acid solution. Use of a liquid form of the oxalate can be beneficial for controlling the addition of the oxalate in terms of amount and time of addition. Adding a solid can lead to local areas of excess oxalate, even when the mixture is stirred. Addition of the liquid oxalate can be performed in batches or by continuous addition over a period of time. Continuous addition can be achieved by various means known in the art, such as by continuous pumping of the liquid into the stirring mixture of acidic feed solution.

In some embodiments, the oxalate is added quickly, such as within 1 minute. In other embodiments, the oxalate is added over a longer period of time, such as 30 minutes or 60 minutes, or more. The time required for oxalate addition can depend on a number of factors, including, for example, the volume of the reaction (and consequently the amount of oxalate that needs to be added). Larger volumes will require longer mixing times to reach homogeneity.

Following addition of the oxalate, the mixture is stirred, or otherwise mixed, preferably until no more REE-oxalate precipitate is formed, or until it is determined that the majority of the REE present has been precipitated. Again, the length of this "aging" period will depend on various factors, such as the equipment used for mixing and the amount of REE present in the initial acidic feed solution.

Step 3: Removal of REE-Oxalate

After the REE-oxalate precipitate has formed, stirring or mixing is stopped. In some embodiments, the precipitate is then allowed to settle.

The REE-oxalate precipitate is removed from the mixture by a solid/liquid separation process. This can comprise, for example, simply decanting the liquid from the settled precipitate, or centrifugation, or filtration (gravity or vacuum).

In some embodiments, following separation from the liquid, the REE-oxalate is washed to remove impurities. The wash is performed using a wash liquid, which can be an acidic wash.

In some embodiments, excess reducing agent is separated from the mixture immediate prior to separation of the REE-oxalate. It is important that, if the excess reducing agent is separated from the mixture prior to REE-oxalate separation, the reducing agent be separated immediately prior to the REE-oxalate separation. This is to ensure that the ferrous present in the mixture is not oxidized back to ferric before the REE-oxalate separation. As noted above, the presence of ferric ions will interfere with the REE-oxalate precipitation.

Separation of unreacted Fe(0) reducing agent can be done using a magnet, of any type, or by gravity separation.

In an alternative embodiment, the excess reducing agent is removed from REE-oxalate following separation. Again, in the case where the reducing agent is Fe(0) this can be achieved using a magnet, of any type.

Figure 5:
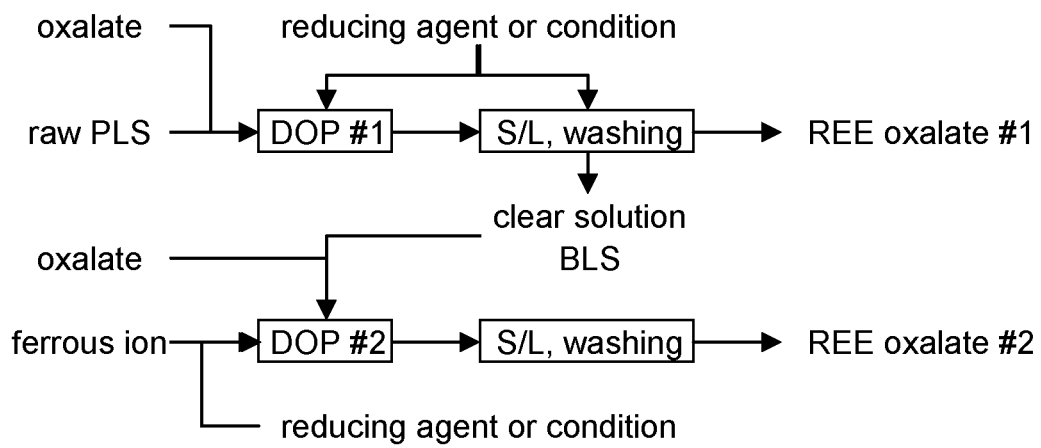
FIG. 5 is a flowchart summarizing a two-step or multi-step direct oxalate precipitation process according to one embodiment.

The present application further provides a process that comprises two or more direct oxalate precipitations. FIG. 5 schematically depicts a process comprising two direct oxalate precipitations.

In some instances, a one-step direct oxalate precipitation may not be sufficient to obtain both high REE recovery and high product (REE oxalate purity). A two-step or multi-step direct oxalate precipitation allows the first REE oxalate to be produced under more favorable conditions so that the impurities in the precipitate are minimized and are rejected to the solution. In one embodiment of a two-step or multi-step process, the first direct oxalate precipitation makes use of less oxalate. This will improve the purity of the precipitate but will also result in a reduced yield. This is addressed by performing a second direct oxalate precipitation on the remaining solution to improve recover additional REE.

The second direct oxalate precipitation can be performed in the same manner as the first precipitation, except that the initial acid feed solution is replaced by the liquid remaining after separation of the first direct oxalate precipitation (DOP #1). This remaining liquid can be referred to herein a barren leach solution. The barren leach solution (BLS) may require pH adjustment, or not, prior to the second precipitation. Similarly, the addition of further reducing agent, or oxalate, or both (as illustrated in FIG. 5), may or may not be required prior to the second precipitation. This will depend on the nature of the barren liquid solution remaining after the first precipitate, DOP #1, is separated.

In the second direct oxalate precipitation, ferrous may be significantly precipitated together with REE. The color of ferrous oxalate is yellow (REE oxalate is typically white). This allows the observation of ferrous oxalate contamination in the second direct oxalate precitate (DOP #2), which in turn can allow for further purification of DOP #2 to remove ferrous oxalate.

Therefore, DOP #2 is typically less pure than DOP #1, with more impurities, including significantly more iron.

In some embodiments, the process of the present application additionally comprises steps for recovery of oxalate from the BLS, which can then be recycled for use in further oxalate precipitations.

Figure 6:
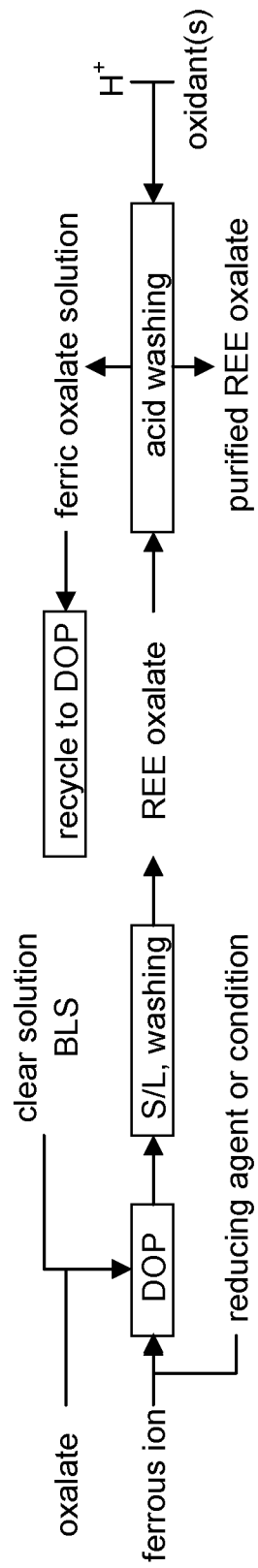
FIG. 6 is a flowchart summarizing a process according to one embodiment, which comprises acid washing an REE oxalate precipitate and recycling of excessive oxalate in BLS.

FIG. 6 schematically depicts a process for recovering excess oxalate from a BLS and recycling the recovered oxalate in a direct oxalate precipitation.

In one-step or two-step or multi-step direct oxalate precipitation, there is a risk that ferrous ion is excessive to the point that oxalate is forming a ferrous salt and precipitate (Eq 3). To address this issue, an acid wash step is included in the process as shown in FIG. 6.

The REE oxalate produced after direct oxalate precipitation is washed using acid in the presence of oxidation agents or oxidising conditions (Eq 4). The iron oxalate and some other impurities (minor amount) can be effectively washed into the solution phase. Because this solution contains a significant amount of oxalate, it can be recycled back to the direct oxalate precipitation step. The REE oxalate is therefore purified to a solid product with a higher purity.

The acid wash method can be applied to both one-step and multi-step direct oxalate precipitation operations. It can also be used to wash REE oxalate produced in other oxalate precipitation processes for both producing higher purity product and recovering oxalate reagent for recycle purposes. To ensure the success of oxalate precipitation with ferrous, sometimes, it is necessary to increase the ferrous concentration in solution. Therefore, adding ferrous ion is an optional step for oxalate recovery (Eq 3).

$$Fe^{2+}+C_2O_4^{2-}=FeC_2O_4\downarrow \quad (3)$$

$$FeC_2O_4+0.5H_2O_2+3H^+=Fe^{3+}+H_2C_2O_4+H_2O \quad (4)$$

To gain a better understanding of the invention described herein, the following examples are set forth. It should be understood that these examples are for illustrative purposes only. Therefore, they should not limit the scope of this invention in any way.

EXAMPLES

Example 1: Direct Oxalate Precipitation of REE from a Pregnant Leach Solution

Materials and Methods

The PLS used in this study was a leach solution from a Canadian REE whole ore after acid baking. The PLS composition was determined to be as shown in the table below.

| Elem | units | Feed (provided by Search Minerals) |
|------|-------|-------|
| L-La | ppm | 169.58 |
| L-Ce | ppm | 377.16 |
| L-Pr | ppm | 43.09 |
| L-Nd | ppm | 159.12 |
| L-Sm | ppm | 25.31 |
| L-Eu | ppm | 1.26 |
| L-Gd | ppm | 23.39 |
| H-Tb | ppm | 0.21 |
| H-Dy | ppm | 3.47 |
| H-Ho | ppm | 19.28 |
| H-Er | ppm | 3.53 |
| H-Tm | ppm | 9.70 |
| H-Yb | ppm | 1.04 |
| H-Lu | ppm | 8.48 |
| L-Sc | ppm | 0.96 |
| H-Y | ppm | 96.39 |
| V-Nb | ppm | 0.21 |
| V-Zr | ppm | 1.32 |
| X-K | ppm | 25.68 |
| X-Mg | ppm | 183.73 |
| X-Na | ppm | 47.78 |
| X-P | ppm | 1.16 |
| X-S | ppm | 3992.10 |
| X-Si | ppm | 208.66 |
| X-Ti | ppm | 22.26 |
| X-Zn | ppm | 114.81 |
| X-Pb | ppm | 6.95 |
| X-Mn | ppm | 148.66 |
| X-Al | ppm | 403.41 |
| X-Ca | ppm | 679.77 |
| X-Fe | ppm | 1126.02 |
| R-Th | ppm | 15.14 |
| R-U | ppm | 0.22 |

Titration Test Procedure

To demonstrate the difference between conventional oxalate precipitation and the present direct oxalate precipitation process, titration tests were conducted and compared.

400 mL of PLS was titrated with 1.0 mol/L oxalic acid. The first titration was performed without iron (conventional oxalate precipitation). A second titration was performed with 1.5 grams of Fe(0) present in 400 mL of PLS. The iron metal was hydrogen reduced powder.

At different stages of titration (with difference oxalic acid dosage), the clear solution sample was taken by filtration (micro filter) for elemental analysis and result was then used to calculate the total recovery of REE at certain oxalic acid addition levels.

REE Precipitation Process

Figure 7:
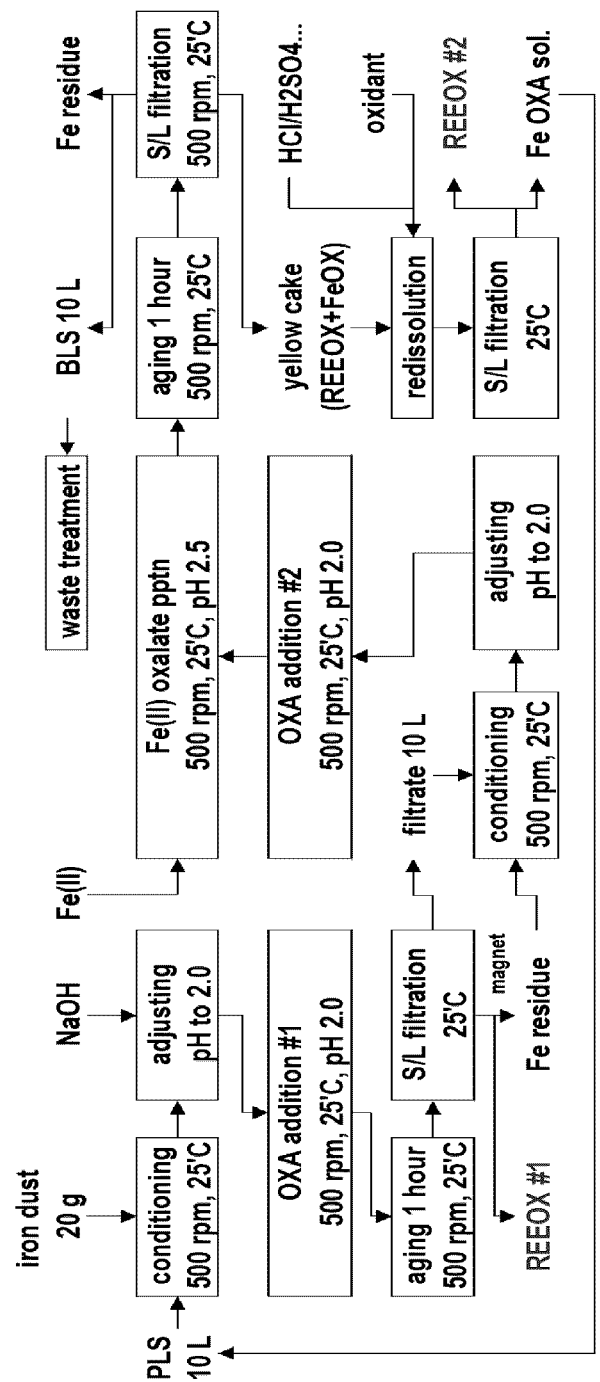
FIG. 7 is a flowchart summarizing testing steps for a two-step direct oxalate precipitation process according to one embodiment.

As illustrated schematically in the flowsheet of FIG. 7, a 10 liter PLS was used, which was first conditioned at 25° C. in a glass reactor with overhead mixer offer 500 rpm rotary agitation through a ¾ inch diameter impellor.

The pH of the feed solution was then adjusted to 2.0 with NaOH.

Once the pH was stabilized and maintained at 2.0 with NaOH, oxalic acid was titrated over 30 minutes of time to the PLS at a slow adding rate (dripping). The agitation and temperature were maintained at 500 rpm and 25° C., respectively. The resulting solid and liquid was aged for one hour at 500 rpm and 25° C. Throughout the aging period, the pH was monitored and maintained at 2.0.

The resulting pulp was separated through a micro filter set using Whatman filter paper into solid and liquid. The solid was further separated into magnetic and non-magnetic portions with a magnet. The non-magnetic portion was REE oxalate #1. The magnetic portion was the leftover iron powder and some REE oxalate solid (minor).

The filtrate clear solution was then sent to a second oxalate precipitation step. The solution was conditioned with iron power again. The pH was maintained at 2.0. Oxalic acid was dripped over 30 minutes of time to the solution. The agitation and temperature were kept at 500 rpm and 25° C. More REE oxalate would be precipitated at this time if there was any more left in the feed solution of this step.

After 30 minutes of oxalic acid addition, ferrous sulfate was added to the pulp to allow ferrous concentration in an excessive range. Due to the presence of ferrous ion, $FeC_2O_4$ was precipitated as a yellow solid. The conditions of reaction were 500 rpm, 25° C. and pH 2.5.

The mixture was allowed to age for one hour at 500 rpm and 25° C. Then it was separated using Whatman filter paper and a magnet into three products: Fe metal residue, BLS, and yellow cake (wet).

The yellow cake was acid washed to re-dissolve $FeC_2O_4$. HCl was used in this study and acid wash pH was between 1.0 and 1.8. Hydrogen peroxide was used as the oxidant in this step. After the acid wash, there was white solid left. The total amount of this white solid could be close to zero in certain conditions. However, if present, it was called REE oxalate #2. The yellow ferrous oxalate was completely dissolved at the end of the acid wash, producing a dark red solution containing ferric ion and oxalate.

Results and Discussion

Titration Test Results

FIGS. 8 and 9 show the titration results of oxalate precipitation with and without reducing agent (iron powder). FIG. 10 compared the titration curve of these two tests. The first experiments performed were titrations of 400 mL of PLS with 1.0 molar oxalic acid. The first titration was performed without iron powder to convert ferric iron to its ferrous form. It can be seen in FIG. 8 that the system required 35 mL of oxalic acid 1.0 M to obtain a total REE recovery greater than 95%. A second titration was performed with 1.5 grams of Fe(0) present in 400 mL of PLS and it can be seen in FIG. 9 that the system required 17 mL of oxalic acid 1.0 M to obtain a total REE recovery greater than 95%, half the amount required in absence of Fe(0). FIG. 10 illustrates this shift in the titration curve.

Fe(0) is a cheap chemical relative to the cost of oxalic acid. Consequently, the use of Fe(0) can significantly reduce the cost of REE precipitation.

Two-step Direct Oxalate Precipitation Test Results

A total of ten tests were conducted to gradually adjust the configuration of reagent conditions.

The first six experiments of the iron dust flowsheet were performed in 500 mL reactors and with 400 mL of PLS. 1.5 grams of Fe(0) was added to each the PLS and the pH adjusted to 2.0 using NaOH (10 wt/wt %). The objective of the first oxalate addition was to recover as much REE as possible. Therefore, 20 mL of oxalic acid was added. 10 mL of oxalic acid were added in the second oxalic acid addition step to recover any REE that did not precipitate following the first addition. Only the last two of this series of four experiments were successful in the dissolution of the yellow such that their TSD could be calculated. Those two experiments had a TSD of 6.0.

The next two experiments used 25 mL and 15 mL of oxalic acid 1.0 M for the oxalic acid additions. During the first addition of those two experiments, some yellow solid was formed in addition to the traditional white solid that are REOs. This could be explained by the large excess of oxalic acid reacting with ferrous iron to from ferrous oxalates, which are of a light-yellow colour (Sigma-Aldrich, 2017). Both experiments were successful in the yellow cake dissolution and their TSD varied between 6.5 and 6.7. Table 2 summarizes the solid purities and impurities in the first precipitate and the TSD of the two series of experiments.

TABLE 1

| Purity and impurity weight percent in first precipitate (400 mL PLS) | | |
|---|---|---|
| | 20 + 10 mL OXA experiments | 25 + 15 mL OXA experiments |
| Solid Purity (%, REO mass based) | 53-60% | 30-31% |
| Solid Impurity (%, elemental mass based) | 4-5% | 13-14% |
| TSD | 6.0 | 6.5-6.7 |

The last two experiments performed were scaled-up from previous experiments. 10 L of PLS were used instead of 400 mL, a scale-up factor of 25. Initially, all the reagents volumes were multiplied this factor. However, it became evident that the amount of Fe(0) was greater than required. Twenty grams of Fe(0) was used in experiments rather than the 37.5 grams based on the calculations for the scale-up.

In the previous experiments, using 20 mL and 10 mL of oxalic acid resulted in higher solid purity and yielded a lower TSD and therefore, those values were used for the scale-up. However, during the study, some light-yellow solid appeared alongside the white solid during the first oxalic acid addition of 500 mL. This suggested that there was a significant excess of oxalic acid resulting in the formation of ferrous oxalates. From those observations, it was decided to slightly reduce the volume of oxalic acid in the first addition from 500 mL to 450 mL. The second addition was kept at 250 mL of oxalic acid. This study resulted in a solid purity of 47%, an impurity percentage of 3% and a TSD of 4.6.

To compare the TSD of this process to the TSD of a simple iron precipitation process, the REE recovery target in the first solid was set the 90% instead of 100%. Based on the titration performed on 400 mL of PLS, a volume of 200 mL of oxalic acid 1.0 M was added instead of 450 mL. The study was performed based on those values and resulted in a total REE recovery of 84.5%, a solid purity of 68%, solid impurity of 2% and a TSD of 3.2. Table 3 compares the result of both experiments.

TABLE 3

Purity and impurity weight percent in first precipitate (10 L PLS)

|  | 450 + 250 mL OXA experiment | 200 + 300 mL OXA experiment |
|---|---|---|
| Solid Purity (%, REO mass based) | 47% | 68% |
| Solid Impurity (%, elemental mass based) | 3% | 1% |
| TSD | 4.6 | 3.2 |

Discussion

REE in the raw PLS has been found to be effectively recovered by adding oxalate. However, the challenge was how to cut the reagent dosage and how to cut the process complexity to improve economic performance.

The oxalate was added as oxalic acid or oxalate salts, which are dissolvable. The oxalate could be added as solid (e.g., a salt) or as solution (e.g., aqueous oxalic acid). However, it was found that use of a solution was desirable to prevent incomplete reactions and to allow better control of oxalate addition over time.

Using a reducing agent, such as iron metal, was found to substantially minimize the oxalate consumption. Non-limiting examples of other reducing agents that can have a similar effect are: hydrogen gas, carbon dioxide gas, nitrogen gas, and sulfite salts. Furthermore, various forms of iron metal can be used, for example: powder, wires, wool, dust, chips and so on. However, to accelerate the reactions, a finer iron metal form is typically desired.

The direct oxalate precipitation operation pH is typically controlled between 0 and 3.5 and more preferably between 1 and 2.5. pH lower than 1 can reduce REE recovery, while pH higher than 3 may result in precipitation of undesired various impurities.

The direct oxalate precipitation is typically conducted at room temperature, or ambient temperature to reduce the cost. Using lower temperature can also work but with a risk of difficulties in filtration. Using elevated temperature also works with higher risk of forming REE sulfate Na/K/$NH_4^+$ double salts, and with an increase in operating costs.

After reductive conditioning, direct oxalate precipitation is typically operated over a few hours of duration. The typical steps include oxalate (oxalic acid or dissolved oxalate salts) addition, the addition could be all at once or slowly spread out over a longer period of time. The latter is recommended to allow thorough reactions and better crystallization. After addition of oxalate, an optional aging with agitation and an optional settling stage can be included in the process to benefit the overall metallurgical performance.

The amount of oxalate to add in the first and, optional, second precipitation is an important parameter in the design of multi-step direct oxalate precipitation. Typically, in the first precipitation the oxalate addition should be sufficiently high to precipitate the majority of REE present in the starting mixture but low enough to avoid precipitation of impurities. In the second precipitation, the oxalate addition should be sufficiently high to recovery all or the majority of the REE that are required, but not any higher than that (otherwise purity suffers).

To help the oxalate recovery (producing yellow ferrous oxalate) in the second precipitation, ferrous ion can be optionally added. The ferrous can be in the form of any dissolvable ferrous salts or solutions. Typically, more ferrous in the solution is beneficial for higher oxalate recovery as solid. However, higher than necessary amount of ferrous concentrate is not recommended due to economic considerations.

In both the first and second precipitations, the solid and liquid separation can be done by filtration or settling and decantation. The isolation of iron metal residue from other solid products can be done by magnetic separation under wet conditions. The iron residue can be collected by magnet and then reused, for example in later direct oxalate precipitation processes.

Example 2: Direct Oxalate Precipitation Process Parameter Optimization

Oxalic acid is an important reagent utilized for the precipitation of rare earth elements (REE) from ore samples [Chi, R.; Xu, Z. A solution chemistry approach to the study of rare earth element precipitation by oxalic acid. *Metallurgical and Materials Transactions B*.1999.30 (2), 189-195]. In an attempt to reduce the oxalic demand, iron powder is added to the feed to convert ferric ions to their ferrous form. Two approaches can be used to determine the effect of each parameters on the direct oxalate precipitation process. The first one focuses on the recovery of REE from the feed solution and can be calculated as follows:

$$\% \text{ recovery of } n = \left(1 - \frac{m_{n_f}}{m_{n_i}}\right) \times 100$$

where:
n represents the target element or group of elements
$m_{n_f}$ represents the mass of the target element or group of elements in the final filtrate
$m_{n_i}$ represents the mass of the target element or group of elements in the feed solution This approach focuses on the individual elements or group of elements, like the light rare earth elements. This approach is useful in knowing the amount left in the filtrate, in function of the initial concentration in the feed solution. One needs to be careful while using recovery as a measure of the effectiveness of a certain tests as certain experimental conditions might result in a high recovery of rare earth elements (REE), which is desirable, but the same conditions might also yield high recovery for impurities, as both often occur simultaneously.

A second approach can be used to study the effect of the target variables. This second method is by calculating the solid purity. From results provided by the analytical service group (ASG), the mass of each target element in the solid is determined. To obtain the solid purity in terms of the mass of total REE to the total mass of dry solid, the elemental mass is converted to the oxide mass of the REE compounds. The oxides mass is calculated by the multiplication of the elemental mass, by the ratio of molar masses from oxides and elemental as follow:

$$\text{mass}_{oxide} = \text{mass}_{element} \times \frac{\text{Molar mass}_{oxide}}{\text{Molar mass}_{element}}.$$

To calculate the solid purity, the summation of the REE oxides mass is divided by the total mass of solid collected, as follows:

$$\text{Solid}_{purity}\ (\%) = \frac{\sum \text{mass}_{Oxide, REE}}{\text{mass}_{Dry\ solid}} \times 100$$

The purpose of this study was to optimize specific variables on the precipitation of rare earth elements (REE) and the resulting solid. This provides information on trends in these variables.

For each series of studies, only one variable was altered and the others maintained constant. The base parameters were chosen based on past experiments. The base temperature chosen was 25° C., the base pH was 2.0 and NaOH was used as alkaline. The first few series of tests over estimated the amount of oxalic acid required. Some of those series were later repeated at a lower TSD to better observe variances. The series of tests focusing on the addition period, aging and settling had a longer addition/aging/settling period to enhance the variations resulting from each test. The overall duration of the addition/aging/settling period was two and a half hours, instead of one and a half hour.

Approach

Feed Preparation and Instrumentation

The synthetic feed solution was made in house and was composed of three light rare earth elements (LREE), one heavy rare earth element (HREE), yttrium, ferric and ferrous irons and calcium. All the aforementioned elements were added as sulfates, with the exception of calcium, which was added as calcium hydroxide. The three LREE are cerium, lanthanum and neodymium and the HREE is ytterbium.

To prepare the solution, each compound was individually dissolved in separate 1 L or 2 L beakers before being added to a larger container. The volume was then brought to approximately 19 L, the pH was adjusted to 0.8 using concentrated sulfuric acid, and the volume was brought to 20 L while maintaining the pH at 0.8.

All reagents used as additives were of analytical grade. To monitor pH, Fisher Scientific AB150 pH/mV and Fisher Scientific XL600 Dual Channel pH/mV/Ion/Conductivity/DO pH meters along with Orion 8102BNUWP ROSS Ultra Combination pH probes were used. For all experiments, the pH measurements were recorded with ATC (automatic temperature compensation). Also, for all experiments, pH adjustments were made using $Mg(OH)_2$ as a powder where stated, and with 10 w/w % or 50 w/w % NaOH otherwise.

Procedure

The rare earth elements tests procedure includes: conversion of ferric iron to its ferrous form, pH adjustment, addition of oxalic acid, aging, magnetic removal of iron powder, filtration and solid collection. The procedure can differ slightly depending on the experiments' target variable.

First, 300 mL of synthetic solution is added to a 500 mL reactor. The reactor is placed in a tempered water bath and mixing is done by an overhead stirrer. 0.6 g of iron powder reduced by hydrogen (Fe (0)) is added and the reactor is partly sealed to prevent oxidation and potential evaporation of the solution. The rotation speed of the stirrer is set at 250 RPM and this conditioning lasts 30 minutes.

For pH adjustments and oxalic acid addition, the rotation speed is set to 400 RPM. Using the chosen alkaline (Mg $(OH)_2$ or NaOH), the pH is adjusted to its set value of 2.0. This set value changes for the experiments where pH is the target variable. The desired volume of oxalic acid 1.0 molar is then added with a Masterflex pump over a period of 30 minutes while maintaining pH at set value.

The rotation is then brought down to 250 RPM and the solution ages for an additional 60 minutes.

Afterwards, the reactor is removed from the tempered water bath and the stirrer is rinsed into the reactor to avoid losing solids attached to its surface. The excess iron powder is then remove using three powerful cylindrical rare earth magnets inside a cylindrical PVC sleeve with a ledge. The magnet is removed from the sleeve and the iron powder stays on the sleeve or is stopped by the ledge. The iron powder is washed into a beaker. This removal is performed three times or until there are no more iron powder in the reactor.

The solution is then filtered using a 45 microns filter. With only the flask being disassembled from the filtration set, the filtrate is collected and its volume recorded. The filtration set is reassembled. The beaker containing the iron powder is agitated to try to wash the iron powder from any attached rare earth oxalate. Using another strong magnet on the side of the beaker, the water from this wash is then filtered, and the iron powder is washed with additional distilled water. This process is done three times.

The reactor is rinsed using the wash solutions that are used to wash the solids, 0.05 M oxalic acid, pH 2.0 sulfuric acid and water. The collected solids are then washed by filtering the washed solutions from the reactor. The wash solution is collected and its volume is recorded.

The solids are then collected using distilled water to rinse the filter paper into a pre weighted beaker or vial. The solids then dry for 24 hours or more in an oven at 80° C.

The filtrate is sampled for elemental and oxalate analysis, then is stored in archives. The wash is sampled for elemental analysis, to see if any REE is lost to the wash. Once dry, the mass of the solids collected is measures and approximately 50 mg of solids are then dissolved in a 25 mL volumetric flask using 5 mL of boiling concentrated nitric acid. Small volumes of distilled water can be added to increase volume and help cool down the solution. Once completely cooled to room temperature, the volume is adjusted to 25 mL. This solution is sent for elemental analysis.

The collected iron powder is then digested using a mixture of boiling nitric acid and hydrochloric acid. Approximately 15 mL of nitric acid and 10 mL of concentrated HCl. This solution is transferred to a 50 mL volumetric flask, where the volume is adjusted to 50 mL using distilled water. Approximately 20 mL of this solution is sent for elemental analysis and the rest in stored in archives.

The table below summarizes the operating conditions of a typical study.

| Operation | Additive | Temperature | pH | Duration (min) |
|---|---|---|---|---|
| Conditioning | Fe (0) | 25° C. | Varying | 30 |
| pH adjustment | Alkaline ($Mg(OH)_2$ or NaOH) | 25° C. | 2.0 | 5-20 |
| Oxalic Precipitation | Oxalic acid/Alkaline ($Mg(OH)_2$ or NaOH) | 25° C. | 2.0 | 30 |
| Aging | — | 25° C. | 2.0 | 60 |

| Operation | Additive | Temperature | pH | Duration (min) |
|---|---|---|---|---|
| Iron Powder Removal | — | Room Temp. | N/A | 5 |
| Filtration | — | Room Temp. | N/A | 1 |
| Wash | 0.05M oxalic acid/ pH 2.0 sulfuric acid/ Distilled water | Room Temp. | N/A | 5 |
| Solid Collection | Distilled water | Room Temp. | N/A | 5 |

Determination of Oxalic Acid Demand

FIG. 11 illustrates the benefits of using iron powder reduced by hydrogen (Fe(0)) to decrease the amount of oxalic acid required to recover REE from the PLS. The three titrations performed with Fe(0) present in the solution clearly show that reducing ferric to ferrous decreases the consumption of oxalic acid and a higher REE recovery can be obtain. Those titrations were all performed with 3 g/L of Fe(0) added to solution prior to titrations. At the end of each experiments, unreacted Fe(0) was still present in the reactor, meaning that Fe(0) was present in excess. However, this excess of Fe(0) served as protection from possible oxidation through exposure to air. Using different concentrations of Fe(0) could further decrease the demand of oxalic acid, but the excess of Fe(0) from these titrations suggests that increasing the concentration would not further decrease the oxalic acid demand. Reducing the concentration of Fe(0) should have little effect until Fe(0) in no longer in excess, afterwards, reducing the concentration should increase the oxalic acid demand, approaching the results from the titration without Fe(0) present in the solution.

Effect of Iron Powder Concentration

FIG. 12 illustrates that at a fixed TSD of 1.94, increasing the concentration of Fe(0) in the solution can increase the recovery of total rare earth elements, up to a maximum. This maximum likely corresponds to the concentration at which Fe(0) becomes in excess, as discussed above. When the Fe(0) concentration is below the excess threshold, this suggests that some ferric has not been converted to ferrous and is competing with REE to form precipitates with oxalates ions present in the solution. For the test with 1 g/L of iron powder, most of the iron had dissolved and only a small amount was collected. This suggests that close to the threshold.

FIG. 13 illustrates the effect of iron powder concentration on the purity of the final solids. The data suggests that a much higher purity of was obtained when using 1 g/L of iron powder, relative to when 2 and 3 g/L were used. Although, the iron powder removal procedure is not infallible and one needs to consider that there is a possibility that some iron powder residue was collected with the rare earth oxalate precipitate. This additional mass could falsely lead to believe that the solid purity is lower than it really is. For the tests with 2 and 3 g/L of iron powder, a large amount of residual iron powder was collected compared to the test with 1 g/L. For those tests, this increases the possibility of the magnet not being able to retrieve all the iron powder from the reactor and that some was potentially collected along the rare earth oxalate precipitate.

Effect of Temperature

FIG. 14 illustrates the effect of temperature on the recovery of REE from the solution. At a high TSD value, temperature had little effect. The recovery seemed to slightly decrease, but this could be attributed to factors other than temperature, such as uncertainty of measurements of volumes and the analytical concentration measurements. At a TSD value of 0.86 and using NaOH as alkaline, increasing the temperature increased recovery, before decreasing at temperature above 50° C. At a TSD value of 0.82 and using $Mg(OH)_2$ as alkaline, REE recovery slowly decreased as temperature increased and decreased more significantly at temperatures above 75° C. Without wishing to be bound by theory, the overall decrease in recovery could be explained by the increase in solubility of the rare earth oxalate complexes.

FIG. 15 illustrates the effect of temperature on the solid purity. It can be seen for both series using NaOH as alkaline, that the solid purity decreased with increasing temperature. This can be attributed to the formation of sodium sulfates, which occurs at higher temperatures. The series with the lower TSD value yielded solids with higher purity.

The solid purity of the series using $Mg(OH)_2$ as alkaline was greater than obtained from the two series using NaOH as alkaline, and the purity seemed to increase slightly with temperature. However, when combined with its corresponding recovery of REE in FIG. 14, it may be that solid purity was increasing due to a lesser amount of solids being produced overall.

Effect of pH

FIG. 16 illustrates the effect of pH on the recovery of REE. It can be observed that for a TSD value of 1.31 and above, no trend can be conclusive as the variations are minors and could be attributed to other factors such as the uncertainty of the instruments of measurement. As for the series with a TSD of 0.95 and 0.96, the variations are considerably more pronounced. For the series with NaOH as alkaline, no conclusive trend was observed but an optimal value of pH at approximately 2.0 was found. Alternatively, for the series with $Mg(OH)_2$ as alkaline, the data showed that the recovery of REE increased with pH, increasing from 86.6% to 92.2% at the highest pH.

FIG. 17 illustrates the effect of pH on the purity of the solids. At the highest TSD values, the solid purity appeared to decrease with increasing pH, regardless of the alkaline used. As for the series with a TSD value of 1.31 and using $Mg(OH)_2$ as alkaline, the solid purity appeared to decrease as pH increased. For the three other series, TSD of 1.31 and 0.95 using NaOH as alkaline and the series with TSD of 0.96 and using $Mg(OH)_2$, the solid purity all appeared to remain constant with the variations not significant enough compared to the other series to draw definite conclusions regarding an increase or decrease of solid purity with increasing pH. Furthermore, tests using NaOH as alkaline appeared to have an overall higher purity at the lower TSD values.

Effect of Addition Time, Aging and Settling

FIG. 18 illustrates that for both TSD values, recovery of REE was improved when the oxalic acid addition was performed over a longer period of time, without aging or settling. Instead of adding all the oxalic acid within 30 minutes and then letting the solution age or settle for two hours, the oxalic acid was added over a period of 2.5 hours. Adding over a longer period of time allowed maintenance of a lower concentration of free unreacted oxalate ions in the solution, whereas adding the oxalic acid within 30 minutes may have created more localized high concentration of free oxalate ions that could trigger competing reactions that could not happen at a lower oxalate concentration.

FIG. 19 illustrates the effect of addition time, aging and settling on the purity of solids. At a TSD of 1.76, the test which had an addition period of 30 minutes and a settling period yielded a higher purity. At the lower TSD value of 1.32, the slow addition of oxalic acid over two and a half hours resulted in the highest purity, followed by the test with a 30 minutes addition and a settling period of two hours.

CONCLUSIONS

To conclude, these studies demonstrated that for the synthetic solution prepared, adding iron powder reduced by hydrogen to reduce ferric to ferrous can greatly decrease the oxalic acid demand. Iron powder can be added past a certain limit, at which point it becomes in excess and protects the solution from oxidation. Staying at or above this concentration limit is important, but it was also shown that large excess of iron powder did not have any benefits at the tested TSD values.

When using NaOH as alkaline, increasing the temperature appears to have no benefits as it decreases both the REE recovery and the solid purity. Room temperature yields the best results. At a TSD of 0.82 with $Mg(OH)_2$ as alkaline, the REE decreases with increasing temperature, from 70.5% at 25° C. to 36.6% at 90° C. Contrarily, solid purity increases from 48.0% at 25° C. to 51.5% at 90° C.

At high TSD values, pH had little to no effect of REE recovery. At a TSD value of 0.95, the recovery of REE increases with pH when using $Mg(OH)_2$ as alkaline, but no conclusion can be drawn when using NaOH as alkaline.

When using NaOH as alkaline, adding the oxalic acid over two and a half hours instead of 30 minutes with aging or settling appeared to yield better REE recovery and higher solid purity. At a TSD of 1.32, the long addition test resulted in a REE recovery of 98.8% and a solid purity of 45.9%, compared to 95.6% and 41.1% for the aging test, and 98.7% and 43.1% for the settling test.

REFERENCES

1. Gorski, B., 1997. Geotechnical Properties of Rock 1997 Update, CANMET-MMSL Report 97-008(TR), Natural Resources Canada.
2. Linke, W. F. and Seidell, A., 1965. Solubilities: Inorganic and Metal Organic Compounds, 4$^{th}$ Edition, Van Nostrand, New York, NY, U.S.A.
3. Chi, R.; Xu, Z. A solution chemistry approach to the study of rare earth element precipitation by oxalic acid. *Metallurgical and Materials Transactions B*. 1999. 30 (2), 189-195.
4. Gupta, C. K; Krishnamurthy, N. Extractive metallurgy of rare earths. CRC Press. 2005.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. A process for obtaining a precipitate of rare earth elements (REE), comprising:
   (a) obtaining an acidic composition comprising the REE;
   (b) adding a reducing agent to the acidic composition and adjusting the pH to 0 to 3.5 with a first amount of a basic agent;
   (c) adding oxalate directly to the composition formed in step (b) and mixing to form an REE oxalate precipitate;
   (d) removing the REE oxalate precipitate from the mixture of step (c) by a first solid liquid separation process; and, optionally,
   (e) washing the REE oxalate precipitate with a wash liquid to obtain a clean REE oxalate precipitate;
   wherein the reducing agent is Fe(0), and
   wherein in step (d), prior to removing the REE oxalate precipitate or simultaneous with removal of the REE oxalate precipitate, excess Fe(0) is separated from the mixture, optionally using one or more magnets, or by gravity separation.
2. The process of claim 1, wherein the acidic composition comprising the REE is a pregnant leach solution.
3. The process of claim 1, wherein in step (b) the pH is adjusted before, during or after addition of the reducing agent.
4. The process of claim 1, wherein in step (b) the pH is adjusted to 0.5 to 3.0.
5. The process of claim 1, wherein the basic agent comprises one or more of a sodium, magnesium, calcium or ammonium salt of hydroxide, oxide, carbonate, or bicarbonate.
6. The process of claim 1, wherein the Fe(0) is an iron powder, iron chips or an iron screen.
7. The process of claim 1, wherein in step (c) the oxalate is added as a solid or as an aqueous solution of oxalate or oxalic acid.
8. The process of claim 1, wherein in step (c) the oxalate is added in a single addition, or a step wise or continuous addition over a period of time.
9. The process of claim 8, wherein the period of time is at least 1 minute.
10. The process of claim 1, wherein in step (d) the first solid liquid separation process is filtration, settling (or sedimentation), centrifugation, or decantation.
11. The process of claim 1, wherein following step (d) a second REE oxalate precipitate is removed by performing a second solid liquid separation process on the mixture remaining after a first solid liquid separation process was completed.
12. The process of claim 11, wherein the second REE oxalate precipitate is formed by:
   (i) adding a second reducing agent to the mixture remaining after the first solid liquid separation process and/or adjusting the pH of the mixture remaining after the first solid liquid separation process to 0 to 3.5 with a second amount of a second basic agent, thereby forming a liquid composition; and

(ii) optionally, adding oxalate to the liquid composition and mixing to form the second REE oxalate precipitate.

13. The process of claim 12, wherein the second basic agent comprises the same basic agent as the first basic agent.

14. The process of claim 12, wherein the second basic agent comprises a different basic agent than the first basic agent.

15. The process of claim 12, wherein the second reducing agent is Fe(0).

16. The process of claim 15, wherein, prior to removing the second REE oxalate precipitate, excess Fe(0) is removed, optionally using one or more magnets, or by gravity separation.

17. The process of claim 1, wherein the process is performed at a temperature from 5° C. to boiling temperature.

18. The process of claim 1, wherein the process further comprises:

combining the liquid remaining after the removal of the REE oxalate precipitate in step (d) with the wash liquid; and recovering excess oxalate from the resulting combination.

19. A process for obtaining a precipitate of rare earth elements (REE), comprising:

(a) obtaining an acidic composition comprising the REE;
(b) adding a reducing agent to the acidic composition and adjusting the pH to 0 to 3.5 with a first amount of a basic agent;
(c) adding oxalate directly to the composition formed in step (b) and mixing to form an REE oxalate precipitate;
(d) removing the REE oxalate precipitate from the mixture of step (c) by a first solid liquid separation process; and, optionally,
(e) washing the REE oxalate precipitate with a wash liquid to obtain a clean REE oxalate precipitate;

wherein the reducing agent is Fe(0), wherein following step (d) a second REE oxalate precipitate is removed by performing a second solid liquid separation process on the mixture remaining after the first solid liquid separation process, and wherein prior to removal of the second REE oxalate precipitate, ferrous sulfate is added in excess to the mixture to precipitate ferrous oxalate and the resulting ferrous oxalate precipitate is removed by the second solid liquid separation process together with the second REE oxalate precipitate.

20. The process of claim 19, wherein the combination of the ferrous oxalate precipitate and the second REE oxalate precipitate is washed with an acid to redissolve the ferrous oxalate under oxidative conditions and remove it from the second REE oxalate precipitate.

* * * * *